United States Patent Office

3,347,817
Patented Oct. 17, 1967

3,347,817
ADHESIVE FOR BONDING ALPHA-OLEFIN COPOLYMERS OR NATURAL RUBBER COMPRISING A DISPERSION OF AN INTERPOLYMER OF ETHYLENE AND 1,4 HEXADIENE, CARBON BLACK AND A SULFUR CURING SYSTEM
Edward Karcher Gladding, New Castle, and Donald Nellis Robinson, Wilmington, Del., assignors to E. I. du Pont de Nemours and Company, Wilmington, Del., a corporation of Delaware
No Drawing. Filed Aug. 27, 1962, Ser. No. 219,750
1 Claim. (Cl. 260—41.5)

This invention relates to the adhesive bonding of α-olefin hydrocarbon polymers and, more particularly, to adhesives therefore as well as composite articles and a process for their preparation.

Normally solid, chain-saturated α-olefin hydrocarbon copolymers are acquiring increasing importance today in the manufacture of a wide variety of useful products. For many applicaitons adhered assemblies are needed wherein these copolymers are bonded to metals or to other elastomers such as neoprene, styrene-butadiene rubber or natural rubber. Unfortunately, however, presently available adhesives are, for one or more reasons, not completely satisfactory. In particular, adhered assemblies prepared using conventional adhesives have exhibited undesirably low peel strengths.

It is therefore, an object of this invention to provide a novel adhesive composition for bonding chain-saturated, α-olefin copolymers to metals and selected elastomers. Another object is to provide a process for the preparation of adhered composite articles from much materials. A further object is to provide curable assemblies of such materials as well as the cured articles prepared therefrom. Yet another object is to provide such cured articles having improved peel strengths. Other objects will appear hereinafter.

These and other objects are accomplished in accordance with this invention by the adhesion of normally solid, chain-saturated α-olefin hydrocarbon copolymers to a layer of curable rubber selected from the group consisting of neoprene, styrene-butadiene rubber and natural rubber which comprises: applying therebetween an adhesive comprising (a) an interpolymer of ethylene and a non-conjugated diene of from 6 to 22 carbons, said interpolymer containing at least 20% side-chain substituted bromine by weight, (b) from about 25 to 50 parts of carbon black per 100 parts of interpolymer, and (c) a curing system selected from the group consisting of sulfur and peroxide curing systems; and subjecting the above components to curing conditions. When it is desired to bond the above olefin polymer to a metal surface the latter is covered with a rubber-metal adhesive of a monomeric organic polyisocyanate or perchlorinated natural rubber which is then placed adjacent to the layer of curable rubber in the above procedure and the assembly then subjected to curing conditions. When bonding the polymer to metal it is preferable, but not necessary, that said interpolymer contain carbon black.

The normally solid, chain-saturated α-olefin hydrocarbon copolymers which can be treated with the novel adhesive of the present invention are the normally solid copolymers of at least two α-monoolefins or of at least one α-monoolefin and at least one non-conjugated hydrocarbon diene. These α-monoolefins have the structure

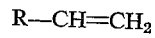

$$R\text{---}CH\text{=}CH_2$$

where R is H or $C_1$–$C_{16}$ alkyl. Representative dienes include dicyclopentadiene; open-chain $C_6$–$C_{22}$ dienes having the structure

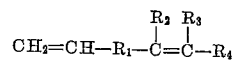

$$CH_2\text{=}CH\text{---}R_1\text{---}\underset{\underset{R_2}{|}}{C}\text{=}\underset{\underset{R_3}{|}}{C}\text{---}R_4$$

wherein $R_1$ is an alkylene radical, $R_2$ and $R_3$ are independently selected from the group consisting of hydrogen and alkyl radicals, and $R_4$ is an alkyl radical; a 5-alkenyl-substituted 2-norbornene; 5-methylene-2-norbornene; and a 2-alkyl-2,5-norbornadiene.

Representative examples of useful α-monoolefins having the structure $R\text{---}CH\text{=}CH_2$ include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Representative examples of copolymers made from these α-monoolefins and the above-described non-conjugated dienes and their preparation are described in U.S. Patents 2,933,480 and 3,000,866. The preferred copolymers are ethylene/propylene; ethylene/propylene/dicyclopentadiene; and ethylene/propylene/1,4-hexadiene. Copolymers of from about 30 to 70 weight percent ethylene, about 30 to 70 weight percent propylene and up to about 5 weight percent 1,4-hexadiene or dicyclopentadiene are particularly preferred.

The novel adhesive composition of the present invention is preferably applied as a dispersion, preferably 10–20% by weight, in a volatile inert organic liquid of a sulfur-curable composition. The heart of this composition is a sulfur-curable, normally solid, chain-saturated ethylene interpolymer containing at least about 2.5 gram-atoms/kilo, preferably 3.75–5.5 gram-atoms/kilo of side-chain bromine; this corresponds to 20 and about 30 to 45% bromine by weight, respectively. The peel strength of the novel composition tends to fall off if the halogen-substituted copolymer contains less than about 20% by weight bromine. Although copolymers containing about 30–45% by weight bromine are preferred, those containing from about 20–30% by weight bromine are satisfactory. It is not convenient to prepare copolymers containing much over 50% by weight bromine and such a high proportion of the halogen is not necessary.

The halogen-containing interpolymers generally consist of monomer units of (1) ethylene; (2) at least one halogenated olefin, said olefin being selected from the class consisting of: (a) compounds having the structure

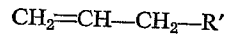

$$CH_2\text{=}CH\text{---}CH_2\text{---}R'$$

where R' is a monovalent aliphatic hydrocarbon radical substituted by at least one bromine atom, and (b) 2-norbornenes substituted by at least one bromine atom and having one unsubstituted carbon-carbon double bond; (3) a nonconjugated hydrocarbon diene as defined above; and optionally (4) at least one unsaturated hydrocarbon monomer other than ethylene capable of being polymerized with a coordination catalyst.

In the first class of bromine-containing copolymers having the general structure $CH_2\text{=}CH\text{---}CH_2\text{---}R'$ where R' is a monovalent aliphatic hydrocarbon radical substituted by at least one atom of bromine, the bromine atom can be present in groups such as

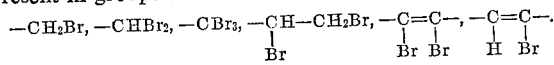

Preferred olefins of this class have the structures

and

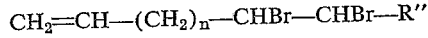

where $n$ is a number from 1–12 and $R''$ is a hydrocarbon group. Representative members include: 4-bromo-1-butene; 5-bromo-1-pentene, which is particularly preferred; 7-bromo-1-heptene; 9-bromo-1-nonene; 11-bromo-1-hendecene; 13-bromo-1-tridecene; 15-bromo-1-pentadecene; 12-bromomethyl-1-tridecene; 5-bromo-1-hexene; 6-bromo-5-bromomethyl-1-heptene; 4,5-dibromo-1-hexene; 5,6-dibromo-1-hexene (another preferred compound); and 4,4,5,5-tetrabromo-1-heptene.

Representative examples of 2-norbornenes substituted by at least one bromine atom include: 5-bromo-2-norbornene; 5-bromomethyl-2-norbornene; syn-7-bromo-2-norbornene; anti-7-bromo-2-norbornene; 5,5-dibromo-2-norbornene; and 5,6-dibromo-2-norbornene.

Representative examples of the bromine-containing copolymers used in the adhesive composition of the present invention include:

ethylene/5-bromo-1-pentene/1,4-hexadiene;
ethylene/propylene/4-bromo-1-butene/11-ethyl-1,11-tridecadiene;
ethylene/5-bromo-2-norbornene/6-methyl-1,6-heptadiene;
ethylene/15-ethyl-1,15-heptadecadiene/7-bromo-1-heptene;
ethylene/dicyclopentadiene/5,6-dibromo-1-hexene;
ethylene/4,4,5,5-tetrabromo-1-hexene/5-methylene-2-norbornene;
ethylene/1-octadecene/6-bromo-5-bromomethyl-1-heptene/2-ethylnorbornadiene;
ethylene/5,5-dibromo-2-norbornene/5-(1'-propenyl)-2-norbornene;
ethylene/2-methylnorbornadiene/5-bromo-1-pentene;
ethylene/4,5-dibromo-1-hexene/1,4-hexadiene;
ethylene/5,6-dibromo-1-hexene/1,4-hexadiene;
ethylene/5-bromo-1-pentene/15-bromo-1-pentadecene/1,4-hexadiene;
and ethylene/1-butene/5,6-dibromo-1-hexene/12-bromomethyl-1-tridecene/6-methyl-1,6-heptadiene.

It is preferred to employ interpolymers containing at least 30 weight percent ethylene monomer units since a lesser percentage usually results in interpolymers having a molecular weight which is too low for easy handling and, furthermore, they are expensive owing to lower yields. It is also preferred that about 0.1 to 0.8 gram-mole of carbon to carbon double bonds be present in each kilogram of the halogen-substituted interpolymer. When less double bonds are present the cure tends to be less satisfactory and a higher number of double bonds is generally unnecessary. The concentration of carbon to carbon double bonds is determined by bromination (as described more particularly in the examples).

A particularly suitable interpolymer contains from about 30 to 60 weight percent ethylene, about 1 to 5 weight percent 1,4-hexadiene and about 40 to 70 weight percent 5,6-dibromo-1-hexene. Another preferred interpolymer is one of about 30 to 60 weight percent ethylene and 40 to 70 weight percent 1,4-hexadiene which has subsequently been brominated to from about 30 to 40 weight percent bromine.

The above-described halogen-substituted interpolymers may be prepared by contacting the monomers in an inert solvent, e.g., methylene chloride, at temperatures from $-10°$ C. to 25° C. in the presence of a coordination catalyst system, e.g., vanadium tris(acetylacetonate) with diisobutyl aluminum chloride with a molar ratio of aluminum to vanadium of about 9:1. The concentration of vanadium salt in the copolymerization reaction zone is about 0.00005 to 0.005 mole/liter.

An alternative method of preparing the halogen-substituted interpolymers is by preparing a highly unsaturated polymer of ethylene and a non-conjugated diene having at least about 3 gram-moles of unsaturation per kilogram of polymer and subsequently halogenating the latter.

For example, copolymers containing side-chain bromine can also be made by adding bromine or hydrogen bromide to part of the side-chain carbon-carbon double bonds of ethylene/non-conjugated hydrocarbon diene copolymers which, in turn, can be made using the hydrocarbon dienes and the polymerization procedures heretofore described. The halogenation and hydro-halogenation procedures familiar to those skilled in the olefin art can be used. Representative procedures which are applicable here are given in Synthetic Organic Chemistry, R. B. Wagner and H. D. Zook, John Wiley & Sons, Inc., New York, 1953, pages 106–108. It is not even always necessary to isolate the hydrocarbon copolymer before adding the bromine. For example, after a copolymer has been made in solution and the catalyst deactivated with alcohol, one can add bromine at 0° C. in an amount sufficient to leave about 2 to 5% diene units unreacted and thereafter isolate the copolymer by conventional means.

The preferred highly unsaturated copolymers for bromination are made by copolymerizing ethylene with at least one of the above-described open-chain non-conjugated dienes having the structure

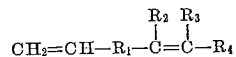

and, optionally, with at least one of the above-described α-monoolefins having the structure $CH_2=CH-R$. These hydrocarbon copolymers have at least about 3 gram-moles of side-chain carbon-carbon double bonds per kilogram and display and inherent viscosity (0.1% by weight solution in tetrachloroethylene at 30° C.) of at least about 0.05.

The highly unsaturated hydrocarbon copolymers are made by contacting the monomers at temperatures between about $-30$ and about 75° C. (preferably 0° to $-10°$ C.) at atmospheric, subatmospheric, or superatmospheric pressure in the presence of selected coordination catalysts. The preferred catalyst used is prepared by mixing about 1 molar proportion of vanadium tris(acetylacetonate) with 7.5 molar proportions of isobutyl aluminum monochloride. The hydrocarbon copolymer can also be made in the presence of a catalyst prepared by mixing vanadyl chloride and organo aluminum compounds such as triisobutyl aluminum or diisobutyl aluminum monochloride. A preferred concentration of the vanadium in the copolymerization reaction zone ranges from about 0.0002 to about 0.001 gram-atom per liter; however, higher or lower concentrations can be employed when desired. The catalyst can be pre-mixed; more frequently, it is formed in situ in the reaction zone. It is frequently the practice to introduce the catalyst after the diene and the monomer liquid have been added to the reactor but before the addition of a highly reactive gaseous monomer such as ethylene. The preferred solvents are tetrachloroethylene and carbon tetrachloride. Alternative solvents which can be employed include other halogenated hydrocarbons such as methylene chloride; liquid paraffins and cycloparaffins such as n-hexane and cyclohexane; and aromatic hydrocarbons such as toluene.

In making these highly unsaturated copolymers having a very righ diene content there is a tendency for the copolymer to contain an undesirably high ethylene monomer unit content because of its great reactivity; thus it is important to control its concentration in the reaction zone. When the reaction vessel has no free vapor space— that is, the reaction system is always liquid full—the concentration of monomers which are gaseous at the temperature and pressure existing in the reactor can be controlled by supplying appropriate quantities of the monomers to the given volume of the reaction medium. When normally gaseous monmers are used in a reaction system which has a vapor space, their concentrations are controlled by the partial pressures in the vapor space and by the reaction temperature. One can use a gaseous diluent such as nitrogen to reduce the partial pressure of ethylene; representative feed streams have 20–50 mole percent ethylene.

After the highly unsaturated hydrocarbon copolymer has been prepared and the catalyst deactivated, the copolymer can be recovered by means familiar to those skilled in the art such as by evaporative distillation, drum-drying, flash-drying and coagulation with a non-solvent such as alcohol. The copolymer is finally dried in a vacuum oven or on a rubber roll mill; a non-volatile antioxidant is often incorporated prior to the final isolation step.

The α-olefin hydrocarbon copolymers and the curable rubbers will usually be loaded with fillers familiar to those skilled in the art. Carbon black is preferred. Any of the conventional reinforcing blacks can be used. Representative types include: furnace blacks, which are preferred; channel blacks; and thermal blacks. Mixtures of blacks can be employed when desired. In general, about 20 to 100 parts, preferably 40 to 80 parts of black are used for every 100 parts of said α-olefin hydrocarbon copolymer and for every 100 parts of said curable rubber.

The adhesive layer containing the bromine-substituted interpolymer will also contain carbon black unless rubber-to-metal adhesion is involved. In the latter instance it is preferable that black be present; however, it may be omitted, if desired.

When carbon black is used in the adhesive composition, enough is provided to give a smooth flowing composition. Those skilled in the art can determine by routine empirical experiments the proper concentration needed to get the best results for a particular copolymer-solvent combination for a specific application. For representative adhesive compositions containing about 10–15% ethylene/5,6-dibromo-1-hexene/1,4-hexadiene copolymer by weight, about 25–50 parts of carbon black preferably 30–40, are present for every 100 parts of copolymer. When more than 50 parts of black are present, the resulting adhesive composition tends to be grossly inhomogeneous and displays less satisfactory adhesive properties than the compositions made within the prescribed range. Any of the conventional reinforcing blocks can be used. Representative types include: furnace blacks, which are preferred; channel blacks; and thermal blacks. Mixtures of blacks can be employed when desired.

The sulfur curing system which can be present in the novel adhesive composition consists of sulfur, a metal oxide, and a curing accelerator. About 0.2–2.0, preferably 0.75–2.0 parts of sulfur are present for every 100 parts by weight of the halogen-substituted copolymer. Compositions containing concentrations below 0.2 part sulfur per 100 provide less satisfactory adhesion; concentrations above 2.0 parts are usually unnecessary. The concentration of the metal oxide is important since it, in conjunction with sulfur and accelerator, controls the ultimate state of bonding. At concentrations of 3 to 10 parts by weight of metal oxide (preferably, zinc oxide) per 100 parts by weight of the halogen substituted copolymer, the rate and state of cure are vey satisfactory. Concentrations below 2 parts per 100 are sometimes less satisfactory for developing and maintaining adequate vulcanizate properties and concentrations above 10 parts per 100 are generally unnecessary. The best accelerators for the vulcanization are also the ones used for curing natural rubber. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyldithiocarbamic acid; the piperidine salt of pentamethylene-dithiocarbamic acid; 2 - mercaptothiazoline; 2-mercaptobenzothiazole; N,N-diethyl-thiocarbamyl-2-mercaptobenzothiazole; and 2,2′-dithio-bisbenzothiazole. A representative and preferred accelerator includes tellurium diethyldithiocarbamate (1.5 parts) and tetra-methylthiuram disulfide (0.75 part). Those skilled in the art can select by routine empirical experiments the best combinations of accelerators when curing a particular assembly. In addition to the above-described components, the novel composition may include such optional components as conventional antioxidants.

Any of the organic peroxide curing systems known in the art for curing natural rubber of ethylene/propylene type elastomers can be used as part of the adhesive composition. The alkyl, alkylaryl or acyl peroxides or per esters (e.g., benzoyl peroxide, phthaloyl peroxide, tertiary butyl perbenzoate or cumyl peroxide), optionally having one or more H atoms replaced by Cl are suitable; activators such as S, Se, Te, or a quinone compound such as p-benzoquinone can be present also; this system is described in Belgian Patent 573,467/59. The preferred peroxides, described in U.S. Patent 2,826,570 have the formula

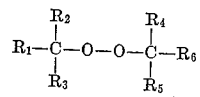

wherein $R_1$ and $R_6$ are aryl and $R_2$–$R_5$ are H or $C_1$–$C_3$ alkyl; their use in curing ethylene/propylene copolymers is described in Canadian Patent 586,944. Other discussions of suitable peroxide curing procedures are contained in: French Patent 1,204,572; U.S. Patent 2,958,672; Australian applications 53,481/59; 62,238/60; and 62,897; Belgian Patent 593,550/61; and British Patent 873,598/61 which discloses activation with polynitroso compounds such as N-methyl-N,4-dinitrosoaniline and poly(1,4-dinitrosobenzene).

The adhesive composition is preferably made up of a homogeneous dispersion in a volatile inert organic liquid. By "volatile" is meant a liquid which boils at standard pressure below about 160° C. The preferred solvent is toluene. However, chlorinated aliphatic hydrocarbons such as methylene chloride (32° boiling point), chloroform (boiling point 61°), carbon tetrachloride (boiling point 78°), methylene bromide (boiling point 98°), and symmetrical tetrachloroethane (boiling point 147°) are one class. Another class includes aromatic hydrocarbons such as benzene (boiling point 80°), toluene (boiling point 111°), ethylbenzene (boiling point 135°), ortho-xylene (boiling point 144°), and isopropylbenzene (cumene) (boiling point 153°). Still another class of useful solvents includes chlorinated aromatic hydrocarbons such as chlorobenzene (132°). The dispersion of the adhesive composition of the present invention is prepared by thoroughly dispersing all of the components in the volatile inert solvent. The order of addition is not critical; however, it is preferred to dissolve the bromine containing copolymer first and thereafter to introduce the remaining components. Optimum performance requires that all of the components be homogeneously dispersed and this is accomplished by conventional agitation. Ball milling is a representative procedure. The mixing can frequently be carried out at room temperature (20–30° C.), but higher temperatures can be employed when desired to reduce the viscosity and accelerate the mixing. The maximum temperature employed can readily be selected by those skilled in the art based on such considerations as the boiling point of the inert solvent and the activation temperatures of the curing agents present in the cement. Since the order of addition is immaterial, it is possible to dissolve the copolymer in one solvent and disperse the remaining components in one or more other solvents and to combine all of the mixtures. It is preferred to dissolve the copolymer and then add the remaining components. Those skilled in the art can vary the solids concentration of the adhesive composition as needed by empirical testing to achieve optimum results for a particular application. Representative compositions have solids contents ranging between about 10 to 20% by weight. The composition is indefinitely stable and can be stored at room temperature for long periods of time such as 3 months. For adhesion of the α-olefin copolymer to layers of neoprene, styrene-butadiene rubber or natural rubber having a thickness well over 5 mils, e.g., 170 mils, it is to be understood that the adhesive composition can include up to an equal weight of neoprene, styrene-butadiene rubber, or natural rubber. A representative composition contains equal weights of ethylene/5,6-dibromo-1-hexene/1,4-hexadiene copolymer and neoprene. It is, of course, necessary that the blended adhesive composition include curing agents for the neoprene, styrene-butadiene rubber, or natural rubber present as well as the sulfur or peroxide-curable ethylene hydrocarbon copolymer. The term "neoprene" as used herein refers to elastomeric polymers and copolymers of 2-chloro-1,3-butadiene.

The elastomers being adhered by the novel composition of the present invention must be compounded with appropriate curing agents. Thus, any of the above-described sulfur or peroxide curing systems can be added to the α-olefin hydrocarbon copolymer containing side-chain unsaturation (e.g., ethylene/propylene/1,4-hexadiene). The saturated α-olefin copolymers (e.g., ethylene/propylene) are compounded with any of the peroxide systems suitable for such copolymer described in the art. The natural rubber and styrene-butadiene rubber can be compounded according to the well-known recipes in the art for sulfur curing. It is to be understood that various modifications of the sulfur curing procedures may be employed depending upon the stock. Various procedures and modifications of sulfur curing are more particularly described in Encyclopedia of Chemical Technology, Kirk and Othmer, published by Inter-science Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, Davis and Blake, published by Reinhold Publishing Corp., New York, 1937, chapter 6; Introduction to Rubber Technology edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

The neoprene stocks which are to be coated with the cement of the present invention are compounded according to the recipes well-known in the art. Further details are given in Introduction to Rubber Technology, supra at pages 340–348; Synthetic Rubber Technology, W. S. Penn, Maclaren and Sons, Ltd., London, 1960, vol. 1, pages 179–232; The Neoprenes, N. L. Catton, E. I. du Pont de Nemours & Co., Inc., Wilmington, Delaware, 1953; and The Applied Science of Rubber, supra at pages 346–370, 397–400, and 1015–1048.

The dispersion of the adhesive composition can be applied in a conventional manner. Thus, it can be brushed on the hydrocarbon elastomer and the neoprene or the natural rubber using such conventional means as brushes, rollers, or swabs. The thickness of the coating applied will be somewhat a function of the strength of the adhesive mixture; it is generally preferred to apply an amount of adhesive sufficient to leave a dry coating 1 to 5 mils thick. After the coating has been applied, it is necessary to dry the coated object. When the volatile inert liquid has evaporated, the coated side of the hydrocarbon elastomer and the neoprene, the styrene-butadiene rubber or the natural rubber are placed together so that the adhesive forms a middle layer. For the best results the layers being adhered together are placed under pressure, such as about 20 to 110 lbs./sq. in., and maintained under pressure during the application of heat. When the assembly is press cured, the ethylene hydrocarbon copolymer may be squeezed out if the pressure is too high. It is, therefore, advantageous to apply a pressure below which this occurs, allow the cure to proceed for about 10–15 minutes, during which time the pressure will fall, and finally restore and maintain the initially applied pressure for the rest of the cure time.

The cure temperature used is generally selected by those skilled in the art for neoprene, styrene-butadiene rubber, and natural rubber cures. Temperatures generally range between about 130 to 160° C., with about 150° C. being preferred. Cure times will range between about 30–60 minutes and will vary inversely with the temperature, higher temperatures requiring shorter cure times. At 150° C. cures of 45–60 minutes are satisfactory. Those skilled in the art will select the particular conditions needed for optimum results based on such considerations as the conditions recommended in the art for the particular curing agents being used, etc.

It has been pointed out above that the neoprene, natural rubber or styrene-butadiene rubber which are adhered to the curable α-olefin hydrocarbon copolymers by the adhesive composition of the present invention, can be joined, in turn, to metals by conventional adhesives such as organic polyisocyanates or perchlorinated natural rubber. This satisfies a definite need since no completely satisfactory adhesive has hitherto been known for bonding these curable α-olefin hydrocarbon copolymers directly to metal. Neoprene is partciularly preferred here. It is immaterial whether or not the neoprene (or natural rubber or styrene-butadiene rubber) is already adhered to the metal at the time bonding to the α-olefin hydrocarbon copolymer occurs. Frequently, however, the neoprene is not bonded to the metal before the curing of the assembly begins.

For bonding the α-olefin copolymers to metal it is particularly advantageous to use a tri-layer adhesive system arranged in the following order: halogen-substituted copolymer; neoprene (less desirably natural rubber or styrene-butadiene rubber); and, conventional rubber-metal adhesive (e.g., organic polyisocyanate or perchlorinated natural rubber). The α-olefin copolymer contacts a layer of the halogen-substituted copolymer composition. When dry, each of these layers prior to the press cure of the assembly is preferably about 1 to 5 mils thick.

In a representative procedure one first applies a coating of the halogen-substituted ethylene copolymer adhesive composition to the surface of the compounded curable α-olefin hydrocarbon copolymer. When this coating has dried adequately, one then applies to it a solution of compounded neoprene; this, in turn, is allowed to dry to give a uniform film. In the meantime the surface of the metal, preferably roughened by conventional procedures such as sandblasting, is coated with methylene bis(4-phenylisocyanate); after the coating has interacted with the metal surface, the neoprene layer is pressed against the coating; curing of the resulting assembly binds the α-olefin hydrocarbon copolymer to the metal. Both the halogen-substituted copolymer and the neoprene (or natural rubber or styrene-butadiene rubber) must be present. Omission of either one or both has cut peel strengths 3 to 6-fold in representative experiments. Approximately a 3-fold decrease in peel strength also has occurred when the diisocyanate was mixed with the neoprene instead of being applied as a coating to the metal.

Any monomeric organic polyisocyanate or mixture of monomeric organic polyisocyanates can be used to bond the neoprene (or natural rubber or styrene-butadiene rubber) to the metal. The polyisocyanate can be applied as a solution in an inert volatile solvent, as in the case of the preferred adhesive methylene bis(4-phenylisocyanate). It can be applied as a liquid or melt, as in the case of toluene - 2,4 - diisocyanate and 1,6-hexamethylene-diisocyanate. Those skilled in the art will recognize that it is preferred that the surface of the metal be allowed to interact with the polyisocyanate coating before adhesion to the neoprene (or natural rubber or styrene-butadiene rubber). Thus coatings of slower acting polyisocyanates such as methylene bis(4-phenylisocyanate) may require several hours or more before being ready for adhesion to neoprene. On the other hand, certain liquid polyisocyanates, such as toluene-2,4-diisocyanate or 1,6-hexamethylene diisocyanate, are applied to the metal immediately before the assembly is cured; if coatings of these polyisocyanates are exposed to moist air for unduly long periods of time, e.g., overnight, the cured assembly may display poor adhesion.

In place of the polyisocyanate one can use fully chlorinated natural rubber (cf. Rubber to Metal Bonding, S. Buchan, Palmerton, New York, 1959, page 182). Coatings of this material are stable to atmospheric moisture. In a representative procedure they are allowed to stand overnight before being adhered to neoprene. Those skilled in the art can determine by routine empirical testing the best way to apply a particular metal coating.

As said above, in using the tri-layer adhesive it is preferred to apply the polyisocyanate (or perchlorinated natural rubber) layer to the metal. The remaining layers, preferably, are coated on the α-olefin copolymer. However, all the layers may be applied to the metal. Alternatively, the metal can be successively coated with the polyisocyanate (or perchlorinated natural rubber) and the neoprene (or natural rubber or styrene-butadiene rubber); the halogen-substituted copolymer then being applied to the α-olefin hydrocarbon copolymer. If desired, the organic polyisocyanate (or the perchlorinated natural rubber) can be applied to the neoprene (or styrene-butadiene rubber) layer and this coated item placed against the metal surface or against a metal surface containing the above-described organic polyisocyanate (or perchlorinated natural rubber) coating.

The invention will now be described with reference to the following examples representing preferred embodiments thereof. All percentages specified therein are by weight unless otherwise indicated.

EXAMPLE 1

An adhesive composition is prepared from a copolymer of 39.3% ethylene, 56.8% 5,6-dibromo-1-hexene and 3.9% 1,4-hexadiene (containing 37.5% bromine, and having an inherent viscosity of 0.40). Tiny strips of the copolymer weighing 55 grams are dissolved in 440 grams of toluene by placing the components in a jar on moving rollers for a period of at least 15 hours at 25–30° C. To the jar are then added 22 grams of super-abrasion furnace black; 2.75 grams of zinc oxide; 0.55 gram of N-phenyl-β-naphthylamine; 0.83 gram of tellurium diethyl dithiocarbamate; 0.41 gram of tetramethyl thiuram disulfide; and 0.55 gram of sulfur. This mixture is agitated on rollers for 15 hours to effect a dispersion.

A layer of ethylene hydrocarbon polymer is prepared from a copolymer of about 48.5% ethylene, about 48% propylene and about 3.5% 1,4-hexadiene having an inherent viscosity of 2.5 (based on a 0.1% solution in tetrachloroethylene at 30° C.). One hundred parts by weight of this copolymer were compounded on a rubber roll mill at 25–30° C. with 5 parts of zinc oxide, 1 part of stearic acid, 80 parts of high abrasion furnace black, 90 parts of a naphthenic light-process petroleum oil ("Circo"), 0.5 part of 2-mercaptobenzothiazole, 1.5 part of tetramethyl thiuram monosulfide, and 2 parts of sulfur.

A layer of natural rubber is prepared by compounding 100 parts of natural rubber smoked sheet on a rubber roll mill at 25–30° C. with 12 parts of zinc oxide, 50 parts of high abrasion furnace black, 2.5 parts of stearic acid, 5 parts of sulfur, 0.36 part of 2-mercaptobenzothiazole, and 1 part of N-phenyl-β-naphthylamine.

The smooth, black, viscous adhesive dispersion prepared as described above is twice painted by brush on 1.25 x 6 x 0.17 inch strips of natural rubber, and ethylene hydrocarbon copolymer described above allowing about 30 minutes between the two coats. Canvas backing is also coated with the adhesive cement. After the coated strips are air dried for at least 15 hours at 25–30° C., they are assembled in two steel molds (1¼ x 6 x ¾ inch with ⅝ inch plunger) in the following order at 25–30° C.: canvas backing, coated ethylene hydrocarbon elastomer with cellophane along 1 inch of length, coated natural rubber and canvas backing. The molds are placed in a press preheated to 150° C. and a platen pressure of 4,000 lbs. (62.5 lb./sq. in.) is applied. As the pressure drops it is re-applied after about 10–15 minutes; after this initial period of vulcanization, the pressure is easily maintained at 62.5 p.s.i. After the press cools to 30–40° C., the pressure is released and the vulcanized assemblies are tested for peel strength by means of an Instrom machine operated at a grip speed of 2 inches per minute. A typical bond so produced between the ethylene hydrocarbon elastomer and the natural rubber exhibits a peel strength of about 54 lbs./lineal inch of width with failure in the ethylene hydrocarbon elastomer stock.

A neoprene layer is prepared by compounding 100 parts of a non-sulfur modified general purpose type of neoprene (Neoprene Type W) on a rubber roll mill at 25–30° C. with 4 parts of magnesium oxide, 4 parts of octamine (the reaction product of diisobutylene and diphenylamine), 0.5 part of stearic acid, 50 parts of medium thermal black, 10 parts of aromatic petroleum oil ("Sundex 85"), 10 parts of zinc oxide, 0.5 part of 2-mercaptoimidazoline and 0.5 part of tetramethylthiuram disulfide. If the above example is repeated in all respects replacing the natural rubber layer with a layer of neoprene as prepared above, a typical ethylene hydrocarbon elastomer-neoprene bond so produced has a peel strength at 25° C. of about 48 lbs./lineal inch of width with failure at the bond. If, however, the procedures of this example are repeated with the omission of the bromine-containing copolymer adhesive inferior peel strengths in the range of about 13 to 14.5 lbs./inch are generally obtained.

EXAMPLE II

The general procedure of Example I is repeated except as indicated herein.

The adhesive composition utilizes a copolymer of 37.9% ethylene, 58.9% 5,6-dibromo-1-hexene and 3.2% 1,4-hexadiene (containing 38.8% bromine by weight, and having an inherent viscosity of 0.48 based on a 0.1% solution in tetrachloroethylene at 30° C.). One hundred parts of this ethylene copolymer and 5 parts of a tackifying resin made by condensing formaldehyde with para-dodecylphenol are dissolved in 650 parts of toluene. To this solution are added 5 parts of zinc oxide, 1 part of N-phenyl-β-naphthylamine; 1.5 parts of tellurium diethyldithiocarbamate, 0.75 part of tetramethylthiuram disulfide, 1 part of sulfur, and 40 parts of super abrasion furnace black.

A layer is prepared by compounding 100 parts of ethylene/propylene/1,4-hexadiene copolymer of Example I on a rubber roll mill with 30 parts of a naphthenic petroleum oil ("Necton 60"), 40 parts of super abrasion furnace black, 5 parts of zinc oxide, 1.5 parts of tellurium diethyldithiocarbamate, 0.75 part of tetramethylthiuram disulfide, 1 part of N-phenyl-β-naphthylamine, and 1 part of sulfur.

A neoprene layer is prepared by compounding 100 parts of a crystallization-resistant, non-sulfur modified general purpose neoprene (Neoprene WRT) on a rubber roll mill with 2 parts of N-phenyl-α-naphthylamine, 0.5 part of stearic acid, 4 parts of magnesium oxide, 5 parts of zinc oxide, 60 parts of super abrasion furnace black, 0.26 part of 2-mercaptoimidazoline, 1 part of tetramethyl thiuram monosulfide, 1 part of diorthotolylguanidine, 0.5 part sulfur, and 7 parts of butyl oleate.

An adhered assembly is prepared from these components as in Example I except that three coats of the viscous adhesive composition were applied to strips of the ethylene hydrocarbon elastomer and neoprene, described above, each coating being allowed to dry for about 16 hours at 25–30° C. After the composite articles have been cured at 100 lb./sq. in. pressure for 60 minutes at 150° C., the assembly will typically have a bond peel strength at 25° C. of about 50 lbs. per linear inch.

If, in this assembly, a layer of styrene-butadiene rubber is substituted for the neoprene layer an assembly will be obtained having a typical bond peel strength of about 38 lbs. per inch.

Substitution of a layer of natural rubber for the neoprene layer of this example will yield an assembly having a typical bond peel strength of 49 lbs. per inch.

EXAMPLE III

The procedure of Example II is essentially repeated in all respects except that the adhesive composition contains 10 parts of tackifying resin and 600 parts of toluene. An ethylene copolymer layer bonded to a neoprene layer will typically exhibit a bond peel strength of 53 lbs. per linear inch of width. If a natural rubber layer is substituetd for neoprene a typical peel strength obtainable is 32 lbs./inch; and, if styrene-butadiene rubber is utilized in a bonded assembly in place of the neoprene layer a bond peel strength of about 12 lbs./inch is generally obtained.

EXAMPLE IV

The procedure of Example II is essentially repeated except that the bromine-containing polymer is first dissolved in 700 parts of toluene on a ball mill according to the general procedure of Example I. Then 50 parts of the tackifying resin of Example 2 are introduced and the mixture is ball milled for another 16 hours at 25–30° C. It is then further compounded according to the procedure of Example II with super abrasion furnace black and the other components mentioned therein. The adhesive composition thereby formed is applied to strips of the ethylene hydrocarbon copolymer, neoprene, natural rubber and styrene-butadiene rubber compositions of Example II. Three coats are applied in every case, each coat being allowed to air dry for about 1 hour at 25–30° C. The composite assemblies are cured in a press at 110 lb./sq. in. pressure for 60 minutes at 150° C. to give adhered assemblies exhibiting the following properties at 25° C.

Assembly: Peel strength (lb./linear in.).
Ethylene hydrocarbon elastomer—
 Neoprene _____ 43
 Natural rubber _____ 35
 Styrene-butadiene rubber _____ 10

EXAMPLE V

One hundred parts of the copolymer of ethylene/5,6-dibromo-1-hexene/1,4-hexadiene of Example II are dissolved in 750 grams of toluene according to the procedure of Example I. To the viscous solution obtained are then added 40 parts of super abrasion furnace black, 5 parts of zinc oxide, 1 part of sulfur, 1.5 parts of tellurium diethyldithiocarbamate, 0.75 part of tetramethylthiuram disulfide, and 1 part of N-phenyl-β-naphthylamine. After the resulting composition has been agitated for 16 hours at 25–30° C., the smooth homogeneous adhesive composition thereby obtained is painted once on strips of the ethylene/propylene/1,4-hexadiene copolymer, neoprene, natural rubber, and styrenebutadiene rubber described in Example II. In every case a canvas backing is applied to the outside of each of the composite compositions, the adhesive composition of the present invention being used between the canvas and the rubber surface. After the strips have dried 4 days, the composite articles are placed in a pre-heated press and maintained at a pressure 100 lb./sq. in. for 60 minutes at 150° C. The adhered assemblies thereby obtained typically exhibit the following bond peel strengths at 25° C.

Assembly: Peel strength (lb./linear in.)
Ethylene hydrocarbon elastomer—
 Neoprene _____ 41
 Natural rubber _____ 59
 Styrene-butadiene rubber _____ 27

EXAMPLE VI

A copolymer of about 64.5% ethylene and 35.5% 1,4-hexadiene (containing 4.3 gram-moles of diene monomer unit per kilogram and having an inherent viscosity of 0.68) is brominated at 0° C. in $CCl_4$ to produce a product containing 32.3% bromine and 0.43 gram-mole of C=C groups/kilogram. An adhesive composition is then prepared using 100 parts of this product dissolved in 700 parts of toluene on a ball mill. The viscous solution obtained is further compounded as in Example V above.

Five coats of the resulting adhesive composition are applied to strips of the ethylene/propylene/1,4-hexadiene copolymer and the natural rubber, neoprene and styrene-butadiene compositions of Example II and the usual canvas backing; each coat being allowed to air dry for 1 hour.

After the assemblies have been placed in molds at 25–30° C., the latter are transferred to presses preheated to 150° C., and kept there at 100 lb./sq. in. for 60 minutes at 150° C. The adhered assemblies resulting display the following typical peel strengths at 25° C.

Assembly: Peel strength (lb./linear in.)
Ethylene hydrocarbon elastomer—
 Natural rubber _____ 24
 Styrene-butadiene rubber _____ 12
 Neoprene _____ 33

EXAMPLE VII

An adhesive composition is prepared dissolving 100 parts of a copolymer of 54.9% ethylene, 40.8% 5-bromo-1-pentene and 4.3% 1,4-hexadiene (containing 21.9% parts of a copolymer of 54.9% ethylene, 40.8% 5-bromo-bromine, having about 0.51 gram-mole of C=C groups/kilogram, and an inherent viscosity of 0.59) in 700 parts of toluene and compounding as in Example V.

Three coats of this adhesive composition are painted on strips of the neoprene, natural rubber, styrene-butadiene and ethylene/propylene/1,4-hexadiene copolymer compositions of Example II and the usual canvas backings, each coat being allowed to dry for about 1 hour at 25–30° C. The assemblies are cured at 100 lbs./sq. in. pressure for 60 minutes at 150° C. to give adhered assemblies displaying the following typical properties at 25° C.

Assembly: Peel strength (lb./linear in.)
Ethylene hydrocarbon elastomer—
 Natural rubber _____ 16
 Styrene-butadiene rubber _____ 44

EXAMPLE VIII

An adhesive composition is prepared using a copolymer of 32.2% ethylene, 66.5% 5,6-dibromo-1-hexene and 1.3% 1,4-hexadiene (containing 43.8% bromine and having an inherent viscosity of 0.39). About 100 parts of this copolymer are dissolved in 700 parts CCl$_4$ containing 1 part stearic acid. The solution obtained is further compounded as in Example V above.

A composite article of ethylene/propylene/1,4-hexadiene copolymer, styrene-butadiene rubber, and canvas backing assembled and cured under pressure according to the procedure of Example V above, gives an adhered assembly exhibiting a typical peel strength of 27 lb./linear in. at 25° C.

EXAMPLE IX

An adhesive composition is prepared using a copolymer of 34.8% ethylene, 62.3% 5,6-dibromo-1-hexene and 2.9% 1,4-hexadiene (containing 41% bromine). One hundred parts of this copolymer are mixed with 900 parts of carbon tetrachloride and roll milled according to the general procedure of Example I for 16 hours at 25–30° C. The resulting solution is then further compounded according to the procedure of Example V. The resulting viscous adhesive composition is applied to strips of the ethylene/propylene/1,4-hexadiene copolymer and Neoprene WRT compositions of Example II and the usual canvas backing except that 20 parts per hundred of another napthenic petroleum oil ("Primoil D") is used instead of "Necton 60" in the ethylene/propylene/1,4-hexadiene. After two coats of the adhesive composition are applied in each case, the layers to be adhered are allowed to dry together at room temperature after the application for 16 hours at 25–30° C. The composite assembly is then heated in a press at 19 lb./sq. in. for 45 minutes at 150° C. The resulting adhered assembly exhibits a typical peel strength of 55 lb./linear in. at 25° C.

EXAMPLE X

A mixed adhesive composition is prepared using a bromine-containing copolymer and neoprene. Fifty parts by weight of the ethylene/5,6-dibromo-1-hexene/1,4-hexadiene copolymer of Example IX and 50 parts by weight of a neoprene elastomer of the type used in Example I (Neoprene Type WRT) are sheeted out in thin films and cut up into tiny strips. This mixture is ball milled with 900 parts of carbon tetrachloride at 25–30° C. for 16 hours. The viscous solution resulting is compounded with the following reagents: 2 parts N-phenyl-α-naphthylamine; 1 part of stearic acid; 2 parts of magnesium oxide; 5 parts of zinc oxide; 0.2 part of 2-mercaptoimidazoline; 3.5 parts of butyl oleate; 1.5 parts of tellurium diethyldithiocarbamate; 0.75 part of tetramethyl thiuram disulfide; 0.63 part of sulfur; 50 parts of super abrasion furnace black. Four hundred parts of carbon tetrachloride were added to the resulting composition and the mixture was ball milled for 16 hours at 25–30° C. The resulting composition was applied three times to the ethylene/propylene/1,4-hexadiene copolymer and twice to the neoprene, natural rubber, styrene-butadiene rubber, compositions of Example II and the usual canvas backing. After drying for 2 days the composite articles of the ethylene copolymer with each of the above described elastomers and the canvas backing are cured in a press at 47 lb./sq. in. pressure for 60 minutes at 150° C. The adhered assemblies thereby obtained exhibit the following typical peel strengths at 25° C.

| Assembly: | Peel strength (lb./linear in.) |
|---|---|
| Ethylene hydrocarbon elastomer— | |
| Neoprene | 19 |
| Natural rubber | 12.5 |
| Styrene-butadiene rubber | 41 |

EXAMPLE XI

An adhesive composition is prepared by ball milling 100 grams of the ethylene/5,6-dibromo-1-hexene/1,4-hexadiene copolymer of Example IX with 800 grams of toluene at 25–30° C. for 16 hours. The smooth viscous solution resulting is compounded with the following reagents: 5 grams of zinc oxide; 30 grams of high abrasion furnace black; 0.5 gram of 2-mercaptobenzothiazole; 1.5 grams of tetramethylthiuram monosulfide and 2 grams of sulfur. The cement is obtained as a homogeneous dispersion.

Strips of natural rubber, Neoprene Type W, and ethylene/propylene/1,4 - hexadiene copolymer compositions are compounded according to the procedure given in Example I above. A strip of styrene-butadiene rubber is prepared by compounding 100 parts by weight of styrene-butadiene rubber 1500 on a rubber roll mill with: 45 parts of superabrasion furnace black; 2.5 parts of pine tar; 6 parts of dioctyl phthalate; 5 parts of zinc oxide; 0.75 part of N - cyclohexyl - 2 - benzothiazole sulfenamide; 4 parts of sulfur; and 0.5 part of stearic acid. Each of these strips is given a 5-mil coating with the adhesive composition and strips of canvas backing (1.25″ x 6″ x 0.170″) are coated with a 20% solution of methylene bis(4 - phenylisocyanate) in carbon tetrachloride. After all the strips have been air dried for at least 15 hours at 25–30° C., they are assembled in the following order: canvas backing, ethylene/propylene/1,4 - hexadiene copolymer with cellophane along one inch of length, Neoprene (or natural rubber or styrene-butadiene rubber, respectively) and canvas backing. These assemblies are cured at 150° C. for 45 minutes at 31 lb./sq. in according to the general procedure of Example I.

The vulcanized assemblies exhibited the following typical peel strengths at 25° C.

| Assembly: | Average peel strength (lbs./linear inch) |
|---|---|
| Ethylene/propylene/1,4-hexadiene copolymer— | |
| Neoprene | 46 |
| Natural rubber | 93 |
| Styrene-butadiene rubber | 29 |

EXAMPLE XII

This example illustrates the bonding of α - olefin hydrocarbon polymers to metals using the novel adhesives of the invention. The ethylene/propylene/1,4 - hexadiene copolymer of Example I (compounded as indicated therein) is selected as the α - olefin hydrocarbon copolymer layer.

A copolymer adhesive is prepared using 100 parts of the bromine-containing copolymer of Example II dissolved in 800 parts of toluene by ball milling for 15 hours. To the solution are added: 40 parts of super abrasion furnace black, 5 parts of zinc oxide, 1.5 parts of tellurium diethyl dithiocarbamate, 0.75 part of tetramethyl thiuram disulfide and 1 part of sulfur. This mixture is ball-milled for 15 hours to give a smooth cement. One hundred parts of the compounded neoprene of Example I are dispersed in 1000 parts of carbon tetrachloride to give a homogeneous neoprene solution.

One hundred parts of methylene bis(4 - phenylisocyanate) (refrigerated at −14° until used, containing only 0.02% dimer and 0.12% trimer) are dissolved in 320 parts of carbon tetrachloride and to be used immediately as isocyanate solution.

Four strips of the ethylene hydrocarbon copolymer described above (1.25″ x 6″ x 0.17″) are each brushed on one side with carbon tetrachloride and allowed to dry at 25–30° C. for 1 hour. Then, one coat of copolymer adhesive is applied to the treated sides. After this coat has dried for an hour, one coat of neoprene solution is applied over it by brush.

Sandblasted strips of steel, stainless steel, brass, and aluminum (1″ x 5″ x 0.125″) are brushed with carbon tetrachloride and allowed to dry for several hours. Then, a coat of freshly-prepared isocyanate solution is applied to the treated metal strips as well as to one side of four strips of canvas backing (1.25″ x 6″ x 0.038″). The canvas backing is only needed in order to get a true adhesive reading. If it is missing, undue stretching of the rubber occurs.

All strips are separately dried at 25–30° C. for 15 hours. Each coating, when dry, is about 1–5 mils thick. They are then assembled in the following order: canvas backing, coated ethylene hydrocarbon elastomer (having coated ethylene hydrocarbon elastomer having cellophane along one inch of length), and coated metal. Thus, the order of components is: canvas backing, methylene bis(4 - phenylisocyanate), ethylene/propylene/1,4 - hexadiene copolymer, ethylene/5,6 - dibromo - 1 - hexene copolymer, neoprene, methylene bis(4 - phenylisocyanate), and metal. The molds are placed in a press preheated to 150° C., and a platen pressure 31 lbs./sq. in. is applied. After this pressure has fallen it is re-applied after 10 minutes. Thereafter, the pressure is held at 31 p.s.i. After 45 minutes total vulcanization time, the platen is cooled by circulating water, and the pressure is released. The assemblies are removed and are tested at 25° C. for peel strength as described in Example I. The following results are typical.

Assembly:  Average peel strength (lbs./linear inch)

Ethylene hydrocarbon elastomer—
  Steel _____ 127
  Stainless steel _____ 122
  Brass _____ 122
  Aluminum _____ 88

If the assemblies are pulled for 1.5 inches of length at 25° C., then heated to 70° C. and pulled for an additional 1.5 inches of length at 70° C., the following typical results are obtained.

| Assembly | Average peel strength (lb./linear inch) | |
|---|---|---|
| | 25° C. | 70° C. |
| Ethylene hydrocarbon elastomer: | | |
| Steel | 149 | 76 |
| Stainless steel | 108 | 70 |
| Brass | 94 | 56 |
| Aluminum | 99 | 54 |

If, however, the same procedure of this example is followed except that the bromine-containing copolymer adhesive is omitted, the following typically inferior results are obtained on testing at 25° C.

Assembly:  Average peel strength (lbs./linear inch)

Ethylene hydrocarbon elastomer—
  Steel _____ 30
  Stainless steel _____ 25
  Brass _____ 17
  Aluminum _____ 16

EXAMPLE XIII

This example illustrates the bonding of an ethylene/propylene copolymer to neoprene and natural rubber using the novel adhesive composition. About 39 grams of an ethylene/propylene copolymer containing 61% propylene (having an inherent viscosity of about 2.46) is milled with 20 grams of Philblack E, 0.08 grams of sulfur and 2.6 grams of dicumyl peroxide to produce a 43 mil. sheet.

An adhesive composition is prepared using the ethylene/5,6 - dibromo - 1 - hexene/1,4 - hexadiene copolymer and other compounding ingredients of Example XI.

Three strips (1.25 x 6") of the ethylene/propylene copolymer are placed together, 2 of which are cleaned with CCl₄, dried for 1 hour and coated with the adhesive composition. Neoprene and natural rubber strips, compounded according to Example I, are also cleaned, dried and coated with the same adhesive. Canvas backing strips are cut and coated with a 20% solution of methylene bis(4-phenylisocyanate) in CCl₄.

After all strips have dried 3 days, they are assembled and vulcanized for 45 minutes at 150° C. and 94 p.s.i. The following test data are typically obtained at 25° C.:

Assembly:  Average peel strength (lb./linear inch)
  Natural rubber—ethylene/propylene _____ 53
  Neoprene—ethylene/propylene _____ 41

EXAMPLE XIV

This example illustrates the bonding of an ethylene/propylene/dicyclopentadiene copolymer to metal. A layer is prepared from 100 parts of a copolymer of 34% ethylene, 61% propylene and 5% dicyclopentadiene (having an inherent viscosity of 2.5) compounded according to the recipe in Example I for the α-olefin hydrocarbon polymer layer. Two strips of this layer (1.25 x 6 x 0.17 inch) are cleaned with CCl₄, dried and coated with the bromine-containing copolymer adhesive composition of Example XI. The strips are then coated with the neoprene solution of Example XII. Strips (1 x 5 x 0.125 inch) of stainless steel and brass are cleaned with carbon tetrachloride, dried for one hour, and coated with a fresh 20% solution of methylene bis(4-phenylisocyanate) in carbon tetrachloride. Two strips of canvas backing are also coated on one side with the isocyanate solution. After drying overnight the strips are assembled and cured according to the procedure of Example XII. The following typical data are obtained at 25° C.

Assembly:  Average peel strength (lbs./linear inch)

Ethylene hydrocarbon elastomer—
  Steel _____ 41
  Brass _____ 42

EXAMPLE XV

A 1.25 x 6 x 0.17 inch strip of the ethylene/propylene/1,4-hexadiene copolymer of Example I is cleaned with carbon tetrachloride, dried at room tempearture for one hour, and coated (to a dry thickness of 1–5 mils) with the adhesive composition of Example XI, dried for one hour at room temperature, coated (to a dry thickness of 1–5 mils) with the neoprene solution of Example XII, dried for one hour at room temperature, and finally coated (to a dry thickness of 1–5 mils) with a freshly prepared 20% solution of methylene bis(4-phenylisocyanate) in dry carbon tetrachloride. A stainless steel strip (1 x 5 x 0.125 inch) is cleaned with carbon tetrachloride. A strip of canvas backing is coated on one side with the 20% methylene bis(4-phenylisocyanate) solution. After all the strips have been dried overnight at room temperature, they are assembled and vulcanized for 45 minutes at 150° C. at a pressure of 31 lbs./sq. in. The cured adhered assembly exhibits a typical peel strength of 118 lbs./linear inch at 25° C. In this example all coats are applied to the copolymer.

EXAMPLE XVI

After a stainless steel strip (1 x 5 x 0.125 inch) has been cleaned with carbon tetrachloride and dried, it is coated (to a dry thickness of 1–5 mils) with the 20% methylene bis(4-phenylisocyanate) solution of Example XV, allowed to dry for one hour at room temperature, coated (to a dry thickness of 1–5 mils) with the neoprene solution of Example XII, dried for one hour at room temperature, and finally coated (to a dry thickness of 1–5 mils) with the adhesive composition of Example XI. A 1.25 x 6 x 0.17 inch strip of the ethylene hydrocarbon copolymer of Example I is cleaned with carbon tetrachloride. A strip of canvas backing is coated on one side with the 20% methylene bis(4-phenylisocyanate) solution. After all the strips have been dried overnight at room temperature they are assembled and vulcanized by the procedure of Example XV. The cured adhered assembly exhibits a typical peel strength of 53 lbs./linear inch at 25° C.

EXAMPLE XVII

In accordance with the procedure of Example I a copolymer adhesive composition is prepared from the following components; 100 grams of a copolymer of 22% ethylene, 74.2% 5,6-dibromo-1-hexene and 3.8% 1,4-hexadiene, by weight (containing 49% bromine and exhibiting an inherent viscosity of 0.45 as measured above); 600 grams of toluene; 5 grams of zinc oxide; 1.5 grams of tellurium diethyl dithiocarbamate; 0.75 gram of tetramethyl thiuram disulfide; and 1 gram of sulfur.

A layer of ethylene hydrocarbon copolymer is prepared from a copolymer of 51.3% ethylene, 45% propylene, and 3.7% 1,4-hexadiene, by weight, having a Mooney (ML-4/100° C.) viscosity of 80. One hundred parts by weight of this copolymer are compounded on a rubber roll mill at 25-30° C. according to the procedure of Example I except that stearic acid is omitted.

One hundred parts by weight of the compounded neoprene of Example I are dispersed in 1000 parts of carbon tetrachloride to give a homogeneous neoprene solution.

Two strips (1.25 x 6.0 x 0.17 inch) of the compounded ethylene hydrocarbon copolymer and steel and aluminum strips (1 x 5 x 0.125 inch) are wiped with toluene. One hour later the hydrocarbon strips are coated with the copolymer adhesive. After this coat has dried for two hours, it is coated with the compounded neoprene solution. The metal strips and two canvas strips are coated with a freshly prepared 20% solution of methylene bis(4-phenylisocyanate) in toluene.

After all the strips have dried separately for about 16 hours, they are assembled (in the order given in Example XII) in end cavities of a 4-cavity mold (each cavity 1.25 x 6 x 0.75 inch with a 0.625 inch plunger). The mold is subjected to 2500 lbs. platen pressure (167 lbs./sq. in.) at 150° for 45 minutes. After the molds have cooled, the pressure is released and the assemblies are removed. The following typical result sare obtained.

| Assembly: | Average peel strength (lb./linear in.) |
|---|---|
| Ethylene hydrocarbon elastomer | |
| Steel | 55 |
| Aluminum | 50 |

This example illustrates the fact that the adhesive composition need not contain carbon black when used to bond the ethylene hydrocarbon copolymer to metal.

The following method is used in determination of the C=C content of the copolymers used in the above examples.

Bromine is allowed to react with a weighed copolymer sample, a potassium iodide solution is added, and the excess bromine is determined by treating the liberated iodine with standard sodium thiosulfate. Potassium iodate is added, and the sample is again titrated to find the extent of substitution.

Twenty-five milliliters of a solution of 5 ml. bromine in one liter of $CCl_4$ is added to a solution of copolymer in 50 ml. of $CCl_4$ at 25° C. in an iodine flask. The flask is stoppered, covered with a few ml. of 25% aqueous KI, and placed in the dark for two hours at 25° C. Then, the KI solution and about 25 ml. of additional 25% aqueous KI are introduced into the flask. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer.

The total bromine moles/kg. $= \dfrac{(B-T)0.1}{2(\text{grams of copolymer})}$ where $B$=ml. 0.1 N sodium thiosulfate used to 1st end point (before $KIO_3$ addition) of blank solution
$T$=ml. 0.1 N sodium thiosulfate used to 1st end point (before $KIO_3$ addition) of copolymer solution The bromine consumed by substitution moles/kg. $=$ $\dfrac{[(M-H)]0.1}{(\text{Grams of Copolymer})}$ where $M$=ml. 0.1 sodium thiosulfate added after $KIO_3$ solution introduced into copolymer solution
$H$=ml. 0.1 sodium thiosulfate added after $KIO_3$ solution introduced into blank solution Composite articles advantageously made by rubber to metal adhesion in accordance with this invention include motor mounts, silent block bushings, tank linings, automotive sealing components, steam hose, tank blocks, and miscellaneous diaphragms, mounts and rolls.

This invention is also very useful in the preparation of rubber to rubber adhered articles such as junctions of side walls and tread stock to the carcass stock and assemblies for vibration dampening purposes.

What is claimed is:

An adhesive composition suitable for bonding sulfur-curable normally solid, chain-saturated copolymers of ethylene, propylene and 1,4-hexadiene to neoprene, SBR, or natural rubber which comprises a 10 to 20% by weight dispersion in a volatile, inert organic liquid of: (a) an interpolymer of 30 to 60% ethylene 1 to 5% 1,4-hexadiene, and the remainder being monomer units containing side-chain substituted bromine, said interpolymer containing from about 30 to 45% bromine by weight; (b) from about 30 to 45 parts of carbon black per part of interpolymer; and (c) a sulfur curing system comprising from about about 0.2 to 2 parts of sulfur and from about 2 to 10 parts of zinc oxide per 100 parts of interpolymer.

References Cited
UNITED STATES PATENTS

| | | | |
|---|---|---|---|
| 2,622,056 | 12/1952 | De Coudres et al. | 156—333 X |
| 2,631,984 | 3/1953 | Crawford et al. | 260—5 |
| 2,900,292 | 8/1959 | Coleman | 156—333 X |
| 3,009,904 | 11/1961 | Serniuk et al. | 156—333 X |
| 3,049,455 | 8/1962 | Werkman et al. | 161—254 X |
| 3,058,859 | 10/1962 | Amberg | 161—243 |
| 3,091,560 | 4/1963 | Miller et al. | 156—333 X |
| 3,106,950 | 10/1963 | Ernst et al. | 156—333 X |

EARL M. BERGERT, *Primary Examiner.*
CLIFTON B. COSBY, *Examiner.*

UNITED STATES PATENT OFFICE

CERTIFICATE OF CORRECTION

Patent No. 3,347,817                            October 17, 1967

Edward Karcher Gladding et al.

It is hereby certified that error appears in the above numbered patent requiring correction and that the said Letters Patent should read as corrected below.

Column 1, line 32, for "much" read -- such --; column 4, line 38, for "and" read -- an --; line 69, for "righ" read -- high --; column 5, line 4, for "monmers" read -- monomers --; line 49, for "blocks" read -- blacks --; column 10, line 28, for "Instrom" read -- Instron --; column 11, line 35, for "substituetd" read -- substituted --; column 12, line 52, strike out "parts of a copolymer of 54.9% ethylene, 40.8% 5-bromo-"; same column 12, after line 67 insert the following:
        Neoprene-----------39

Signed and sealed this 26th day of November 1968.

(SEAL)
Attest:

Edward M. Fletcher, Jr.                        EDWARD J. BRENNER
Attesting Officer                              Commissioner of Patents